(12) United States Patent
Lu

(10) Patent No.: US 11,086,956 B2
(45) Date of Patent: *Aug. 10, 2021

(54) METHOD AND DEVICE FOR PROCESSING HYPERLINK OBJECT

(71) Applicant: Advanced New Technologies Co., Ltd., George Town (KY)

(72) Inventor: Yaran Lu, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 16/721,092

(22) Filed: Dec. 19, 2019

(65) Prior Publication Data

US 2020/0125622 A1    Apr. 23, 2020

Related U.S. Application Data

(63) Continuation of application No. 16/235,770, filed on Dec. 28, 2018, which is a continuation of application No. PCT/CN2017/088587, filed on Jun. 16, 2017.

(30) Foreign Application Priority Data

Jun. 30, 2016  (CN) .................. 201610509248.X

(51) Int. Cl.
*G06F 17/00* (2019.01)
*G06F 16/955* (2019.01)
(Continued)

(52) U.S. Cl.
CPC ...... *G06F 16/9558* (2019.01); *G06F 3/04812* (2013.01); *G06F 3/04842* (2013.01);
(Continued)

(58) Field of Classification Search
CPC .. G06F 16/9558; G06F 16/954; G06F 16/958; G06F 40/134; G06F 3/04812; G06F 3/04842
(Continued)

(56) References Cited

U.S. PATENT DOCUMENTS 7,171,625 B1 * 1/2007 Sacchi ................ G06F 3/0481
345/157
7,568,002 B1 * 7/2009 Vacanti ................ H04L 65/605
709/203
(Continued)

FOREIGN PATENT DOCUMENTS

| CN | 103984727 | 8/2014 |
| CN | 104123282 | 10/2014 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Hassan Mrabi
(74) *Attorney, Agent, or Firm* — Fish & Richardson P.C.

(57) ABSTRACT

An operation instruction for a hyperlink object is received. The hyperlink object is associated with a hyperlink. A determination is made as to whether a predetermined event exists when the operation instruction is received. The predetermined event is different from the operation instruction. In response to determining that the predetermined event does not exist when the operation instruction is received, a first page corresponding to the hyperlink is redirected to. In response to determining that the predetermined event exists when the operation instruction is received, a second page associated with the predetermined event is determined, and
(Continued)

the second page is redirected to. The second page is different from, and associated with, the first page.

23 Claims, 12 Drawing Sheets

(51) Int. Cl.
    *G06F 16/958* (2019.01)
    *G06F 16/954* (2019.01)
    *G06F 40/134* (2020.01)
    *G06F 3/0481* (2013.01)
    *G06F 3/0484* (2013.01)

(52) U.S. Cl.
    CPC .......... *G06F 16/954* (2019.01); *G06F 16/958* (2019.01); *G06F 40/134* (2020.01)

(58) Field of Classification Search
    USPC ....................................................... 715/208
    See application file for complete search history.

(56) References Cited

U.S. PATENT DOCUMENTS

| | | | | |
|---|---|---|---|---|
| 7,975,020 | B1* | 7/2011 | Green | G06Q 30/0241 |
| | | | | 705/14.4 |
| 8,423,889 | B1* | 4/2013 | Zagorie | G06F 16/9577 |
| | | | | 715/255 |
| 2003/0208472 | A1* | 11/2003 | Pham | H04L 29/06 |
| 2004/0004632 | A1* | 1/2004 | Knight | G06F 3/0481 |
| | | | | 715/711 |
| 2008/0235594 | A1* | 9/2008 | Bhumkar | G06F 16/9038 |
| | | | | 715/738 |
| 2009/0064047 | A1 | 3/2009 | Shim et al. | |
| 2011/0126087 | A1* | 5/2011 | Aust | G06F 16/954 |
| | | | | 715/206 |
| 2011/0137753 | A1* | 6/2011 | Moehrle | H04N 21/2547 |
| | | | | 705/27.1 |
| 2011/0202889 | A1* | 8/2011 | Ludwig | G06F 3/04815 |
| | | | | 715/856 |
| 2011/0213655 | A1* | 9/2011 | Henkin | G06Q 30/00 |
| | | | | 705/14.49 |
| 2011/0238524 | A1* | 9/2011 | Green | G06Q 30/0241 |
| | | | | 705/26.7 |
| 2011/0307833 | A1 | 12/2011 | Dale et al. | |
| 2013/0205187 | A1 | 8/2013 | Hawkins | |
| 2014/0026175 | A1* | 1/2014 | Callanan | H04N 21/4341 |
| | | | | 725/112 |
| 2014/0075277 | A1 | 3/2014 | Lee et al. | |
| 2014/0137006 | A1 | 5/2014 | Goodwin et al. | |
| 2014/0198055 | A1 | 7/2014 | Barkway | |
| 2014/0289597 | A1 | 9/2014 | Kim | |
| 2016/0379213 | A1* | 12/2016 | Isaacson | G06Q 20/12 |
| | | | | 705/44 |
| 2017/0111467 | A1* | 4/2017 | Zhang | G06F 40/14 |
| 2017/0147610 | A1* | 5/2017 | Barre | G06F 16/5866 |
| 2019/0138564 | A1 | 5/2019 | Lu | |
| 2019/0306137 | A1* | 10/2019 | Isaacson | G06Q 30/0635 |

FOREIGN PATENT DOCUMENTS

| | | |
|---|---|---|
| CN | 105468275 | 4/2016 |
| CN | 105607857 | 5/2016 |
| CN | 105718156 | 6/2016 |
| JP | 2003091345 | 3/2003 |
| JP | 2010152797 | 7/2010 |
| WO | WO 2013126084 | 8/2013 |
| WO | WO 2015097729 | 7/2015 |
| WO | WO 2016065310 | 4/2016 |

OTHER PUBLICATIONS

European Extended Search Report in European Application No. 17819116.9, dated Apr. 1, 2019, 8 pages.
International Preliminary Report on Patentability in International Application No. PCT/CN2017/088587 dated Jan. 1, 2019; 10 pages.
International Search Report by the International Searching Authority issued in International Application No. PCT/CN2017/088587 dated Sep. 18, 2017; 9 pages.
Nakamoto, "Bitcoin: A Peer-to-Peer Electronic Cash System," www.bitcoin.org, 2005, 9 pages.

* cited by examiner

METHOD AND DEVICE FOR PROCESSING HYPERLINK OBJECT

CROSS-REFERENCE TO RELATED APPLICATIONS

This application is a continuation of U.S. patent application Ser. No. 16/235,770, filed Dec. 28, 2018, which is a continuation of PCT Application No. PCT/CN2017/088587, filed on Jun. 16, 2017, which claims priority to Chinese Patent Application No. 201610509248.X, filed on Jun. 30, 2016, and each application is hereby incorporated by reference in its entirety.

TECHNICAL FIELD

The present application relates to the field of Internet technologies, and in particular, to a method and device for processing a hyperlink object.

BACKGROUND

A hyperlink is essentially a part of a webpage, and is a connection relationship in which a hyperlink object points to a hyperlink target. The hyperlink object can be a text or a picture, and the hyperlink target can be a picture, an email address, a file, or an application.

In related technologies, a user clicks on a hyperlink object to open or run a corresponding hyperlink target. When different users click on the same hyperlink object, the same hyperlink target is opened or run. This hyperlink mode is relatively simple and cannot satisfy diversified user demands.

SUMMARY

The present application aims to resolve one of technical problems in related technologies at least to a certain extent.

Therefore, an objective of the present application is to provide a method for processing a hyperlink object. In the method, when users perform operations on the same hyperlink object, different instructions can be generated to point to different hyperlink targets, to satisfy diversified user demands.

Another objective of the present application is to provide a device for processing a hyperlink object.

To achieve the previous objectives, a first aspect of implementations of the present application provides a method for processing a hyperlink object, including: receiving an operation instruction for a hyperlink object; determining whether a predetermined event other than the operation instruction exists when the operation instruction is received; and redirecting to a target page based on a hyperlink if the previously mentioned predetermined event does not exist; determining an associated page corresponding to the existing predetermined event, and redirecting to the associated page, if the previously mentioned predetermined event exists, where the associated page is related to the target page.

According to the method for processing a hyperlink object that is provided in the first aspect of the implementations of the present application, if another predetermined event exists when an operation is performed on the hyperlink object, the associated page corresponding to the existing predetermined event is determined and the associated page is redirected to, so that different events can be generated to redirect to different associated pages, to satisfy diversified user demands.

To achieve the previous objectives, a second aspect of implementations of the present application provides a method for processing a hyperlink object, including: receiving an operation instruction for a hyperlink object; determining whether a predetermined event other than the operation instruction exists when the operation instruction is received; and redirecting to a target page based on a hyperlink if the previously mentioned predetermined event does not exist; or determining a simplified page corresponding to the existing predetermined event, and displaying the simplified page in the form of a floating window, if the previously mentioned predetermined event exists, where the simplified page is generated based on the target page or an associated page related to the target page.

According to the method for processing a hyperlink object that is provided in the second aspect of the implementations of the present application, if another predetermined event exists when an operation is performed on the hyperlink object, the simplified page corresponding to the existing predetermined event is determined and the simplified page is displayed in the form of a floating window, so that different events can be generated to display different simplified pages, to satisfy diversified user demands.

To achieve the previous objectives, a third aspect of implementations of the present application provides a method for processing a hyperlink object, including: displaying a webpage, where the webpage includes a merchandise picture with a hyperlink; receiving an operation instruction for the picture; determining whether a predetermined event other than the operation instruction exists when the operation instruction is received; and redirecting to a target page of the merchandise included in the picture if the previously mentioned predetermined event does not exist; or redirecting to a purchase window of the merchandise included in the picture if the previously mentioned predetermined event exists.

According to the method for processing a hyperlink object that is provided in the third aspect of the implementations of the present application, the target page is redirected to if no other predetermined event exists when the operation instruction is received; or the purchase window is redirected to if another predetermined event exists when the operation instruction is received, so that different pages can be redirected to in different cases, to satisfy diversified user demands.

To achieve the previous objectives, a fourth aspect of implementations of the present application provides a method for processing a hyperlink object, including: displaying a webpage, where the webpage includes a merchandise picture with a hyperlink; receiving an operation instruction for the picture; determining whether a predetermined event other than the operation instruction exists when the operation instruction is received; and redirecting to a target page of the merchandise included in the picture if the previously mentioned predetermined event does not exist; or displaying a simplified page of a purchase window of the merchandise included in the picture in the form of a floating window if the previously mentioned predetermined event exists.

According to the method for processing a hyperlink object that is provided in the fourth aspect of the implementations of the present application, the target page is redirected to if no other predetermined event exists when the operation instruction is received; or the simplified page of the purchase window is displayed in the form of a floating window if another predetermined event exists when the operation instruction is received, so that different pages can be displayed in different cases, to satisfy diversified user demands.

To achieve the previous objectives, a fifth aspect of implementations of the present application provides a device for processing a hyperlink object, including: a receiving module, configured to receive an operation instruction for a hyperlink object; a determination module, configured to determine whether a predetermined event other than the operation instruction exists when the operation instruction is received; a first redirecting module, configured to redirect to a target page based on a hyperlink if the previously mentioned predetermined event does not exist; and a second redirecting module, configured to determine an associated page corresponding to the existing predetermined event, and redirect to the associated page, if the previously mentioned predetermined event exists, where the associated page is related to the target page.

According to the device for processing a hyperlink object that is provided in the fifth aspect of the implementations of the present application, if another predetermined event exists when an operation is performed on the hyperlink object, the associated page corresponding to the existing predetermined event is determined and the associated page is redirected to, so that different events can be generated to redirect to different associated pages, to satisfy diversified user demands.

To achieve the previous objectives, a sixth aspect of implementations of the present application provides a device for processing a hyperlink object, including: a receiving module, configured to receive an operation instruction for a hyperlink object; a determination module, configured to determine whether a predetermined event other than the operation instruction exists when the operation instruction is received; a redirecting module, configured to redirect to a target page based on a hyperlink if the previously mentioned predetermined event does not exist; and a floating window module, configured to determine a simplified page corresponding to the existing predetermined event, and display the simplified page in the form of a floating window, if the previously mentioned predetermined event exists, where the simplified page is generated based on the target page or an associated page related to the target page.

According to the device for processing a hyperlink object that is provided in the sixth aspect of the implementations of the present application, if another predetermined event exists when an operation is performed on the hyperlink object, the simplified page corresponding to the existing predetermined event is determined and the simplified page is displayed in the form of a floating window, so that different events can be generated to display different simplified pages, to satisfy diversified user demands.

To achieve the previous objectives, a seventh aspect of implementations of the present application provides a device for processing a hyperlink object, including: a display module, configured to display a webpage, where the webpage includes a merchandise picture with a hyperlink; a receiving module, configured to receive an operation instruction for the picture; a determination module, configured to determine whether a predetermined event other than the operation instruction exists when the operation instruction is received; a first redirecting module, configured to redirect to a target page of the merchandise included in the picture if the previously mentioned predetermined event does not exist; and a second redirecting module, configured to redirect to a purchase window of the merchandise included in the picture if the previously mentioned predetermined event exists.

According to the device for processing a hyperlink object that is provided in the seventh aspect of the implementations of the present application, the target page is redirected to if no other predetermined event exists when the operation instruction is received; or the purchase window is redirected to if another predetermined event exists when the operation instruction is received, so that different pages can be redirected to in different cases, to satisfy diversified user demands.

To achieve the previous objectives, an eighth aspect of implementations of the present application provides a device for processing a hyperlink object, including: a display module, configured to display a webpage, where the webpage includes a merchandise picture with a hyperlink; a receiving module, configured to receive an operation instruction for the picture; a determination module, configured to determine whether a predetermined event other than the operation instruction exists when the operation instruction is received; a redirecting module, configured to redirect to a target page of the merchandise included in the picture if the previously mentioned predetermined event does not exist; and a floating window module, configured to display a simplified page of a purchase window of the merchandise included in the picture in the form of a floating window if the previously mentioned predetermined event exists.

According to the device for processing a hyperlink object that is provided in the eighth aspect of the implementations of the present application, the target page is redirected to if no other predetermined event exists when the operation instruction is received; or the simplified page of the purchase window is displayed in the form of a floating window if another predetermined event exists when the operation instruction is received, so that different pages can be displayed in different cases, to satisfy diversified user demands.

Some of additional aspects and advantages of the present application are provided in the following description, and some of the additional aspects and advantages of the present application become apparent from the following description or are understood through the practice of the present application.

BRIEF DESCRIPTION OF DRAWINGS

The previous and/or additional aspects and advantages of the present application become apparent and easily understood from the following description of the implementations with reference to the accompanying drawings.

DESCRIPTION OF IMPLEMENTATIONS

The implementations of the present application are described below in detail, and examples of the implementations are shown in the accompanying drawings. The same or similar reference signs represent the same or similar modules or modules with the same or similar functions. The implementations described below with reference to the accompanying drawings are examples and are merely intended to explain the present application, but should not be construed as a limitation on the present application. On the contrary, the implementations of the present application include all changes, modifications, and equivalents falling within the spirit and connotation scope of the appended claims.

Figure 1:
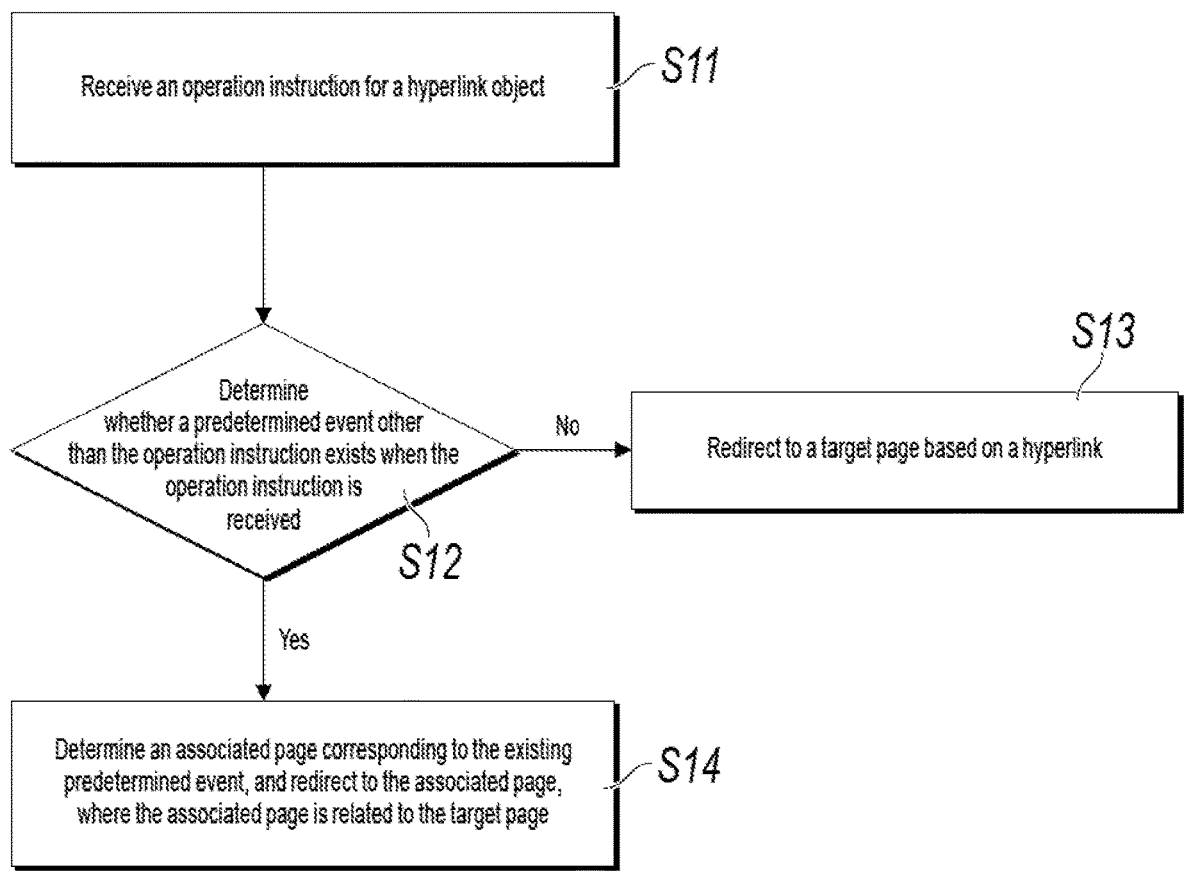
FIG. 1 is a schematic flowchart illustrating a method for processing a hyperlink object, according to an implementation of the present application.

FIG. 1 is a schematic flowchart illustrating a method for processing a hyperlink object, according to an implementation of the present application.

Referring to FIG. 1, the method in this implementation includes the following steps:

S11. Receive an operation instruction for a hyperlink object.

S12. Determine whether a predetermined event other than the operation instruction exists when the operation instruction is received.

S13. Redirect to a target page based on a hyperlink if the previously mentioned predetermined event does not exist.

S14. Determine an associated page corresponding to the existing predetermined event, and redirect to the associated page, if the previously mentioned predetermined event exists, where the associated page is related to the target page.

The operation instruction can be a click instruction.

Therefore, in this implementation, when an operation is performed on the hyperlink object, there is no limitation that only a click operation is performed on the hyperlink object, and another predetermined event can further exist, so that different associated pages can be redirected to based on different predetermined events, to satisfy different user demands.

Further, the method can include: displaying a prompt message to a user when it is detected that a mouse hovers over a location of the hyperlink object, where the prompt message is used to prompt for a mapping relationship between the predetermined event and the associated page.

For example, when the user hovers the mouse on a certain merchandise picture with a hyperlink, the previously described mapping relationship can be displayed in the form of a floating window, a bubble, etc. For example, the previous mapping relationship can be pressing the key "G" to open a quick purchase window, or pressing the key "W" to open an add-to-cart window.

In this implementation, for example, the predetermined event is a document object model (DOM) event. The DOM event can include a keyboard event and a mouse event. For example, the keyboard event is pressing a key or some keys in a keyboard, and the mouse event is clicking or sliding a mouse. Certainly, it can be understood that with development of technologies, the predetermined event is not limited to the keyboard event or the mouse event, and can be a screen touch event, etc.

A script (JavaScript) can be embedded in a webpage, so that a browser implements a corresponding function based on the script. Specifically, the script includes an event (event) detection part and an event processing part.

The event detection part can detect an event occurring on the webpage. The event is an interaction occurring when the user performs an operation on the webpage, for example, a click (click) or a move (move). In addition to the user-triggered action, the event can be document loading, window scrolling, or size adjustment.

The event processing part can define an event model, and the browser can process an event based on the event model. The event model can include an event capture model, an event bubbling model, a W3C model, etc. A specific event model is not limited in this implementation.

Therefore, the browser can detect an event and perform corresponding processing based on the script configured in the webpage. For example, when receiving a click instruction, the browser can determine, through detection, whether a keyboard event or a mouse event further exists, and if yes, determine a specific keyboard event or mouse event.

Further, in this implementation, the target page can be redirected to based on the hyperlink if no other predetermined event exists when the click instruction is received. The target page is a common page corresponding to the hyperlink, and is relatively fixed. Therefore, a hyperlink function can still be implemented even if no other predetermined event exits. Compatibility can be improved in the present solution in comparison with a common shortcut key solution in which a shortcut function cannot be implemented in absence of any key that needs to be combined.

In some implementations, a predetermined event list can be locally configured in the browser, so that when the browser detects that the click instruction for the hyperlink object is received and another event exists, the browser can determine, based on the locally configured information, whether the other event is a predetermined event. As such, when the other event is a predetermined event, it can be determined that the other predetermined event exists; otherwise, it can be determined that no other predetermined event exists.

In some implementations, the predetermined event list can alternatively be configured in a server. When the browser detects that the click instruction for the hyperlink object is received and another event exists, the browser sends the other event to the server. The server determines whether the other event is a predetermined event, and sends a determination result to the browser.

Therefore, the browser can determine, based on the locally configured information or the information configured in the server, whether another predetermined event exists.

In some implementations, the mapping relationship between the predetermined event and the associated page can be preconfigured, to determine, based on the mapping relationship, the associated page corresponding to the existing predetermined event.

Further, the mapping relationship can be locally stored in the browser, or the browser can receive the mapping relationship sent by the server, so that if the browser determines that another predetermined event further exists when the click instruction is received, the browser can determine the corresponding associated page based on the locally configured or received mapping relationship.

Alternatively, the mapping relationship can be configured in the server, so that if the browser determines that another predetermined event further exists when the click instruction is received, the browser sends the existing another predetermined event to the server, the server determines the corresponding associated page based on the configured mapping relationship, and the browser receives the associated page sent by the server.

The associated page can include any one of the following cases: a simplified page of the target page; a page obtained after an operation is performed on the target page; and a simplified page of a page obtained after an operation is performed on the target page.

Further, the page obtained after the operation is performed on the target page can include a page displayed after a certain button on the target page is clicked on, or can include a page displayed after a certain button on a first page is clicked on, where the first page is a page displayed after a certain button on the target page is clicked on. By analogy, the page obtained after the operation is performed on the target page can further include a page obtained after another subsequent operation.

For example, the predetermined event is a keyboard event, and the mapping relationship between the predetermined event and the associated page can be shown in Table 1.

TABLE 1

| Predetermined event | Associated page |
| --- | --- |
| Press the key "G" | Open a quick purchase window |
| Press the key "Q" | Open a simplified version page of a merchandise homepage |
| Press the key "W" | Open an add-to-cart window |
| Press the key "S" | Open an information comparison page of similar merchandise |

In addition, a plurality of pages corresponding to each type of merchandise can include an existing type of page, or can include a customized page.

For example, the add-to-cart window and the information comparison page of similar merchandise are existing types of pages, and the simplified version page and the quick purchase window are customized pages. The simplified version page is a page with less content and/or a smaller picture than an original version, and the quick purchase window is a page with less content and/or a smaller picture than a common purchase window.

Further, various types of pages of the hyperlink object can be pre-generated, and uniform resource locator (URL) addresses of the various types of pages are recorded, to open a corresponding page based on a URL address.

Specifically, if the browser determines, based on the locally configured mapping relationship or the received mapping relationship sent by the server, the associated page corresponding to the predetermined event, the browser can send a request message to the server, where the request message includes information about the hyperlink object and information about the associated page, so that after receiving the request message, the server determines the corresponding associated page based on the information included in the request message, and sends the information about the associated page to the browser. For example, the information about the hyperlink object is a picture identifier, and the information about the associated page is page type information (for example, a purchase window). After the browser adds the picture identifier and the page type information to the request message and sends the request message to the server, the server can determine, based on a preconfigured mapping relationship between the picture identifier and merchandise, the merchandise included in a picture, and then obtain, based on the page type information included in the request message, a URL address of a corresponding type of page of the merchandise. For example, the server obtains a URL address of a quick purchase window of merchandise. Afterwards, the server can send the URL address of the quick purchase window of the merchandise to the browser, so that the browser opens the corresponding page based on the URL address.

If the server determines, based on the locally configured mapping relationship, the associated page corresponding to the predetermined event, the server can obtain information about the corresponding associated page based on information about the hyperlink object and the determined associated page. For example, after detecting a click instruction of the user for a picture, the browser can send an identifier of the clicked picture to the server. The server can determine, based on a preconfigured mapping relationship between the picture identifier and merchandise, the merchandise included in the picture, and then obtain, based on a page type indicated by the associated page, information about a corresponding type of page of the merchandise. For example, the server obtains a URL address of a quick purchase window of merchandise. Afterwards, the server can send the URL address of the quick purchase window of the merchandise to the browser, so that the browser opens the corresponding page based on the URL address.

When the hyperlink object is a merchandise picture, the following procedure can be performed: displaying a webpage, where the webpage includes a merchandise picture with a hyperlink; receiving an operation instruction for the picture; determining whether a predetermined event other than the operation instruction exists when the operation instruction is received; and redirecting to a target page of merchandise included in the picture if the previously mentioned predetermined event does not exist; or redirecting to a purchase window of merchandise included in the picture if the previously mentioned predetermined event exists.

Further, the operation instruction can include a click instruction.

The predetermined event can include a keyboard event or a mouse event.

Specifically, the predetermined event can be a specific event, for example, an event of pressing the key "G".

Further, the purchase window can be a quick purchase window, namely, a page that includes only purchase-related information without including information such as merchandise details on a homepage.

Figure 2:
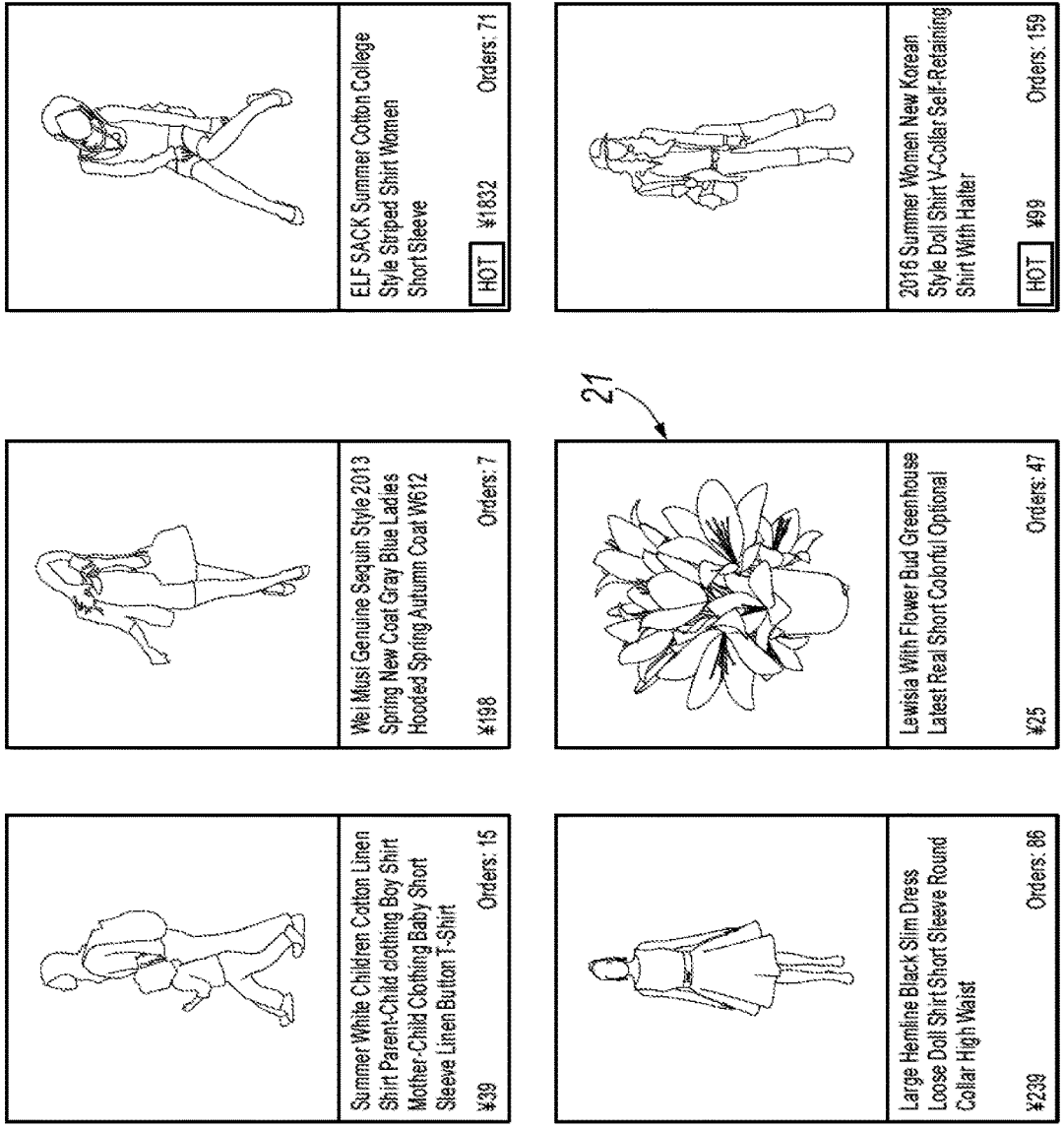
FIG. 2 is a schematic diagram illustrating a merchandise picture used as a hyperlink object, according to an implementation of the present application.
Figure 3:
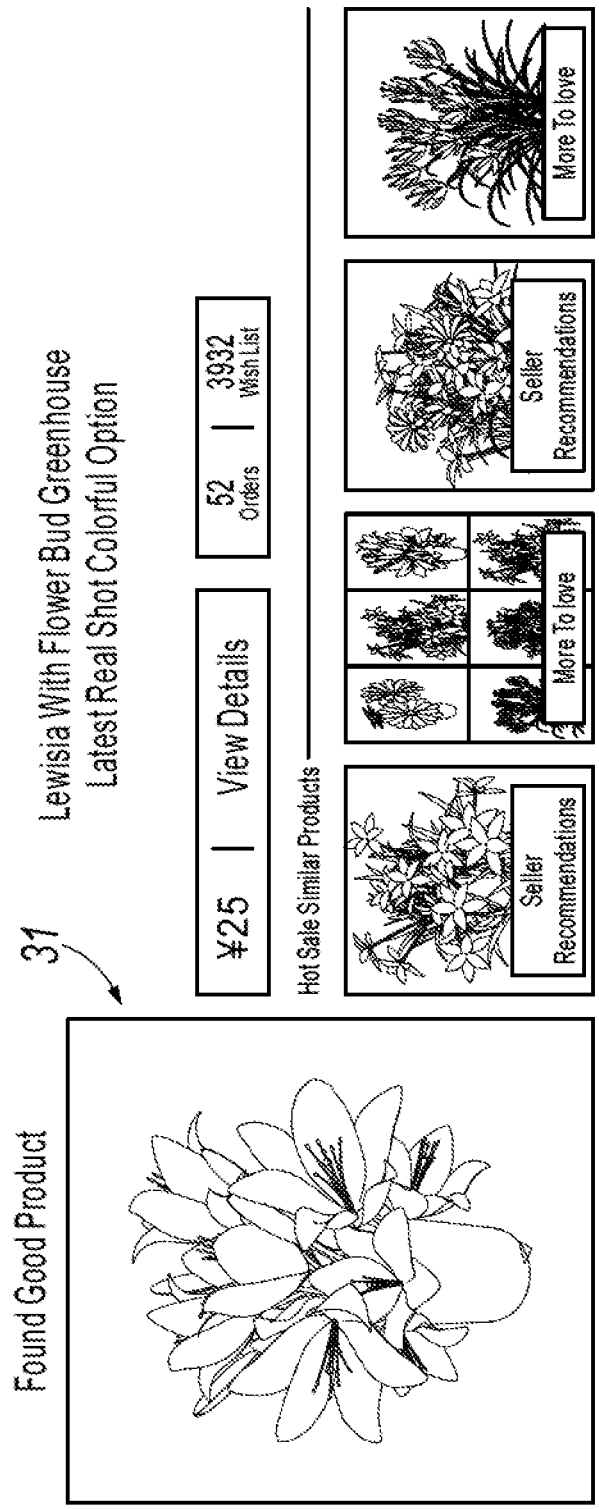
FIG. 3 is a schematic diagram illustrating a page displayed through redirecting if no other predetermined event exists when the merchandise picture shown in FIG. 2 is clicked on, according to an implementation of the present application.
Figure 4:
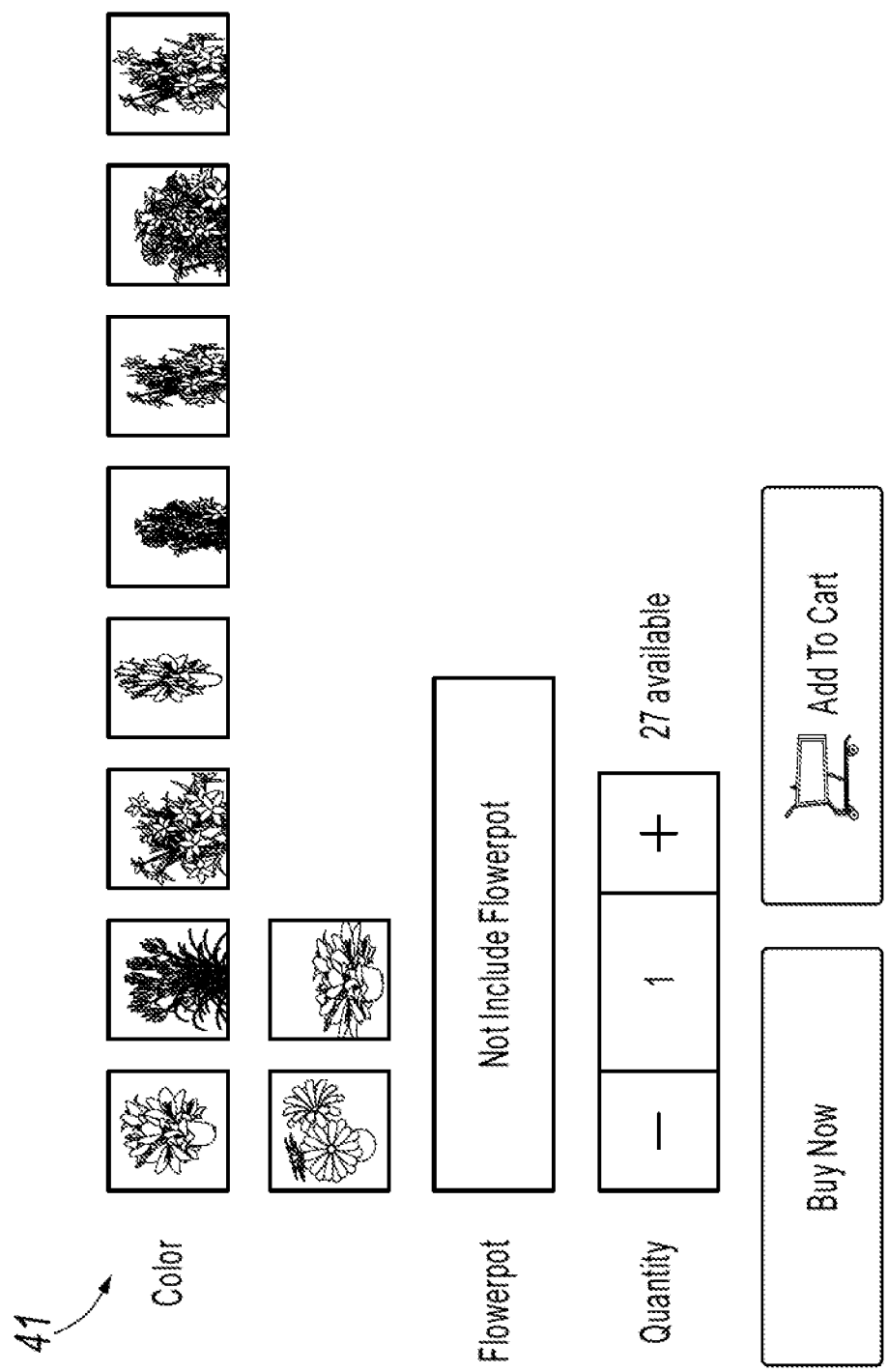
FIG. 4 is a schematic diagram illustrating a page displayed through redirecting if another predetermined event exists when the merchandise picture shown in FIG. 2 is clicked on, according to an implementation of the present application.

In the previous procedure, referring to FIG. 2, when a user clicks on merchandise picture 21 with a hyperlink on a webpage, target page 31 shown in FIG. 3 is directly redirected to if no other predetermined event exists; or quick purchase window 41 shown in FIG. 4 is directly redirected to if another predetermined event exists, specifically, if an event of pressing the key "G" exists.

In this implementation, different pages can be redirected to based on whether another predetermined event exits when the hyperlink object is clicked on, so that a plurality of pages corresponding to the hyperlink can be displayed based on different cases.

Figure 5:
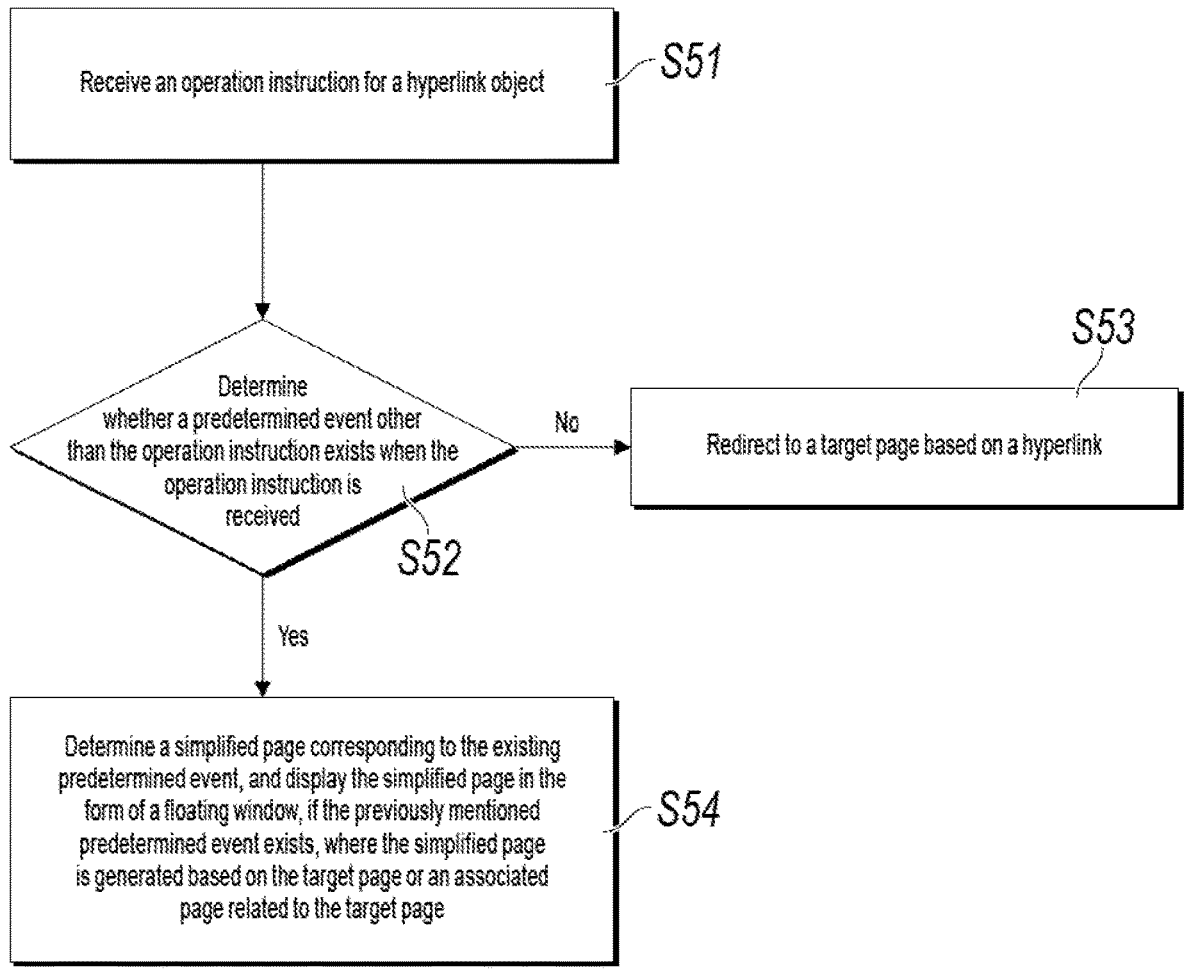
FIG. 5 is a schematic flowchart illustrating a method for processing a hyperlink object, according to another implementation of the present application.

FIG. 5 is a schematic flowchart illustrating a method for processing a hyperlink object, according to another implementation of the present application.

Referring to FIG. 5, a procedure in this implementation includes the following steps:

S51. Receive an operation instruction for a hyperlink object.

S52. Determine whether a predetermined event other than the operation instruction exists when the operation instruction is received.

S53. Redirect to a target page based on a hyperlink if the previously mentioned predetermined event does not exist.

S54. Determine a simplified page corresponding to the existing predetermined event, and display the simplified page in the form of a floating window, if the previously mentioned predetermined event exists, where the simplified page is generated based on the target page or an associated page related to the target page.

Different from the previous implementation, in this implementation, when another predetermined event exists, the simplified page is determined and the simplified page is displayed in the form of a floating window.

Further, the simplified page can include a simplified page of the target page, or a simplified page of the associated page of the target page.

The associated page can include a page obtained after an operation is performed on the target page.

It can be understood that for a part that is not described in this implementation, reference can be made to related content in the previous implementation, and details are omitted here for simplicity.

Further, when the hyperlink object is a merchandise picture, the following procedure can be performed: displaying a webpage, where the webpage includes a merchandise picture with a hyperlink; receiving an operation instruction for the picture; determining whether a predetermined event other than the operation instruction exists when the operation instruction is received; and redirecting to a target page of merchandise included in the picture if the previously mentioned predetermined event does not exist; or displaying a simplified page of a purchase window of merchandise included in the picture in the form of a floating window if the previously mentioned predetermined event exists.

Further, the operation instruction can include a click instruction.

The predetermined event can include a keyboard event or a mouse event.

Specifically, the predetermined event can be a specific event, for example, an event of pressing the key "G".

Further, the purchase window can be a quick purchase window, namely, a page that includes only purchase-related information without including information such as merchandise details on a homepage.

Figure 6:
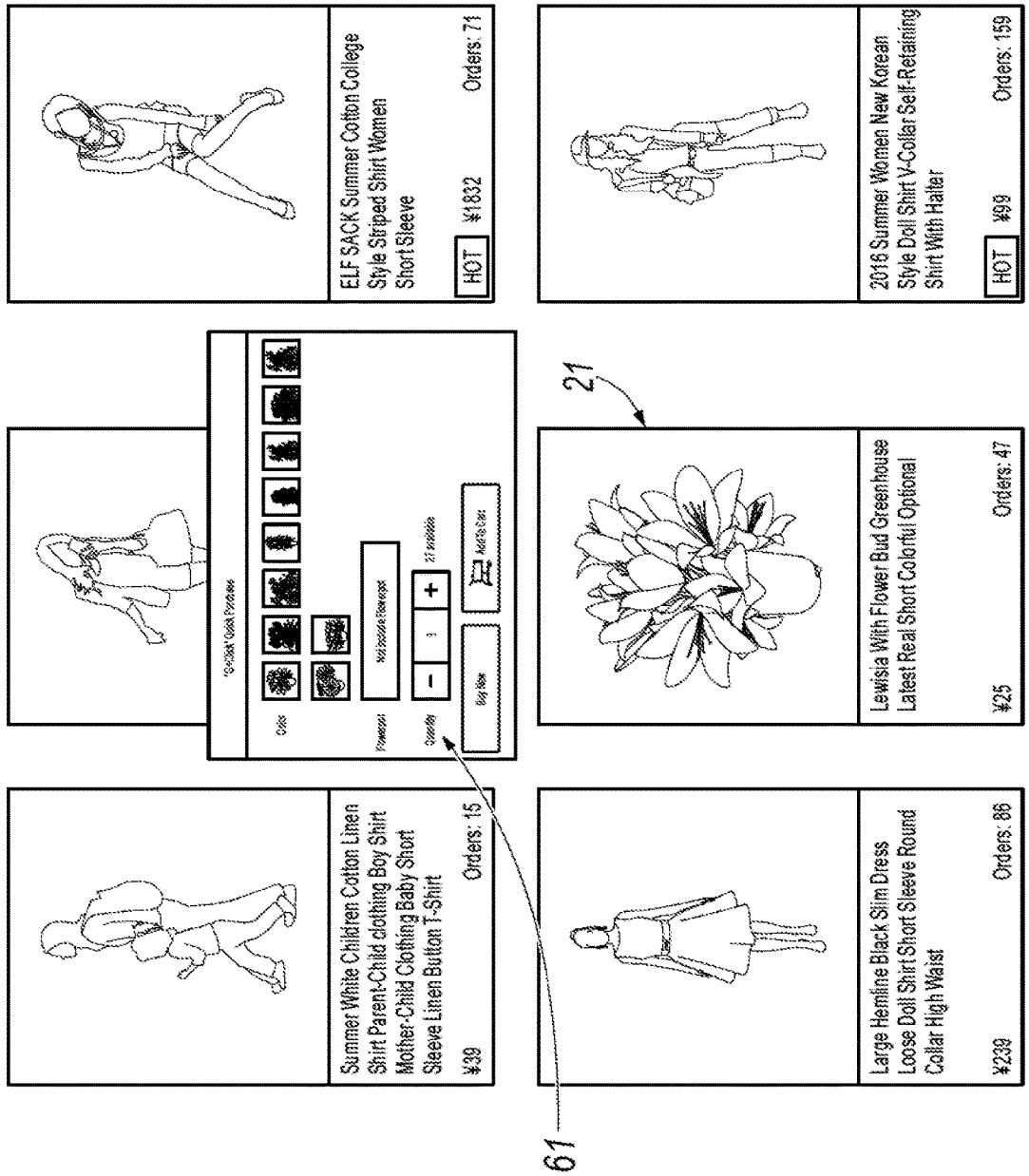
FIG. 6 is a schematic diagram illustrating a page displayed in the form of a floating window if another predetermined event exists when the merchandise picture shown in FIG. 2 is clicked on, according to an implementation of the present application.

In the previous procedure, referring to FIG. 2, when a user clicks on merchandise picture 21 with a hyperlink on a webpage, target page 31 shown in FIG. 3 is directly redirected to if no other predetermined event exists; or quick purchase window 61 shown in FIG. 6 is displayed in the form of a floating window if another predetermined event exists, specifically, if an event of pressing the key "G" exists.

In this implementation, different pages can be displayed based on whether another predetermined event exits when the hyperlink object is clicked on, so that a plurality of pages corresponding to the hyperlink can be displayed based on different cases.

A procedure in an implementation of the present application is described below by using an example in which a predetermined event is a keyboard event and a mapping relationship between the predetermined event and an associated page is stored in a server.

This implementation can be applied when a hyperlink object is a merchandise picture.

An example in which a simplified page is displayed in the form of a floating window is used in this implementation.

Figure 7:
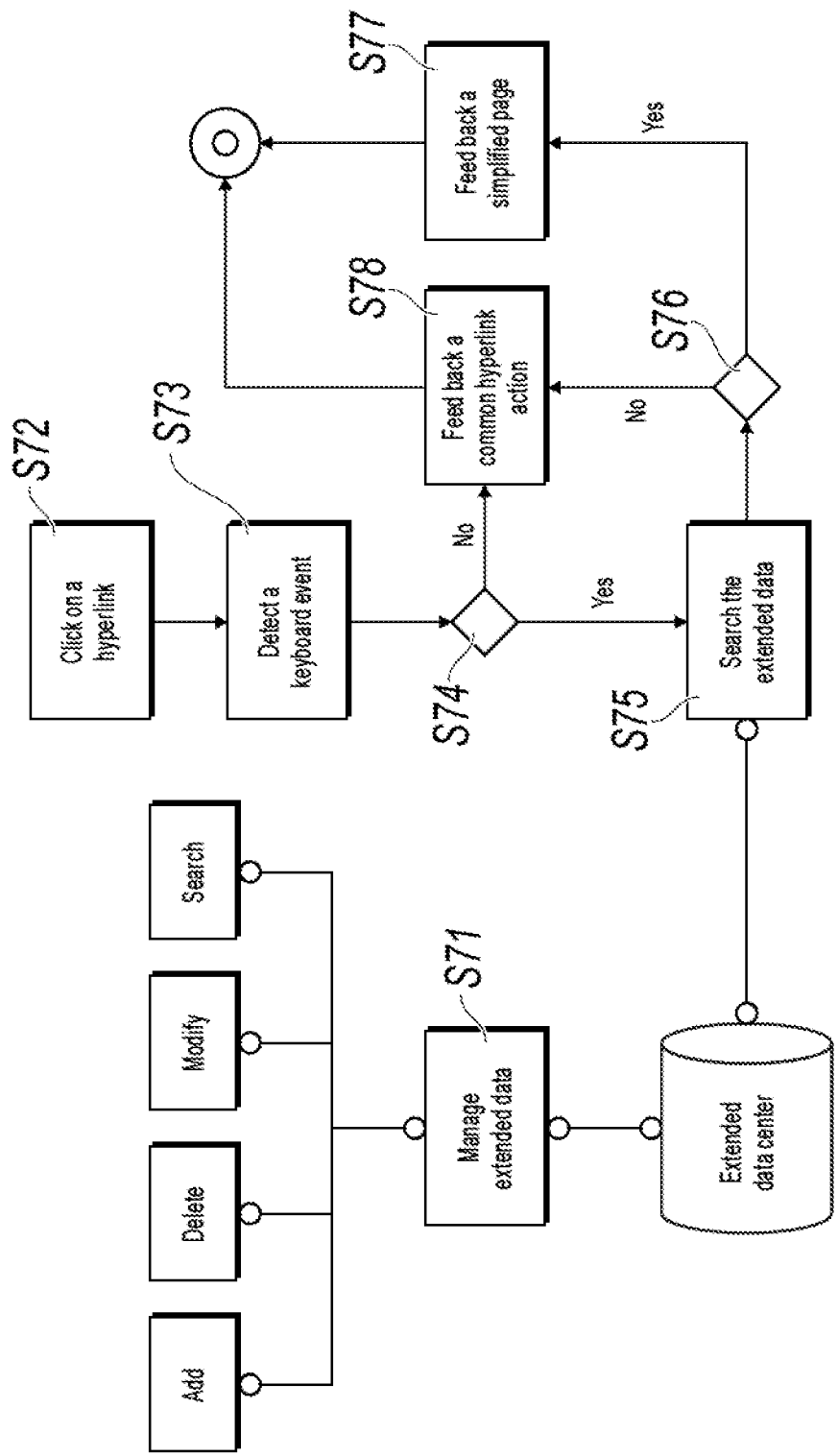
FIG. 7 is a schematic flowchart illustrating a method for processing a hyperlink object, according to another implementation of the present application.

FIG. 7 is a schematic flowchart illustrating a method for processing a hyperlink object, according to another implementation of the present application.

Referring to FIG. 7, a procedure in this implementation includes the following steps:

S71. Configure extended data in a server and store the extended data in an extended data center.

The extended data is used to record a mapping relationship between a predetermined event and an associated page. For example, the mapping relationship is shown in the previously described Table 1.

Specifically, an administrator can configure the extended data through one or more of adding, deleting, modifying, and searching.

S72. A browser receives a click instruction of a user for a merchandise picture.

For example, the browser can first display a webpage to the user, where the webpage includes the merchandise picture, and a hyperlink is set for the merchandise picture.

Afterwards, the user can click on the merchandise picture as wanted. For example, the browser receives the click instruction of the user for the merchandise picture.

S73. Detect a keyboard event.

S74. Determine whether the keyboard event is detected; and if yes, perform S75; otherwise, perform S78.

S75. Search the extended data.

S76. Determine whether a simplified page corresponding to the existing keyboard event is found; and if yes, perform S77; otherwise, perform S78.

S77. Display the simplified page corresponding to the existing keyboard event.

For example, when the existing keyboard event is pressing the key "G", the corresponding simplified page is a quick purchase window based on the mapping relationship shown in Table 1. In this case, the quick purchase window is displayed in the form of a floating window.

S78. Perform a common hyperlink action.

For example, a common target page of merchandise included in the merchandise picture, for example, the target page shown in FIG. 3, is redirected to.

Further, after displaying the corresponding type of page to the user, the browser can further receive an operation instruction of the user for the displayed page, and perform an operation corresponding to the operation instruction.

For example, after the browser displays the quick purchase window, regardless of whether the page is redirected to or is displayed in the form of a floating window, the method can further receive a click instruction of the user for "Buy Now" or "Add To Cart" on the quick purchase window, and perform a corresponding operation based on the click instruction.

In this implementation, the simplified page corresponding to the predetermined event is obtained and the simplified page is displayed, so that when users click on the same hyperlink object, different events can be generated to open different simplified pages, to satisfy diversified user demands. Further, if no predetermined event is detected or no simplified page corresponds to the predetermined event, a common hyperlink mode can be used for implementation, so that the present solution is compatible with the existing solution, and can be applied to an existing page.

Figure 8:
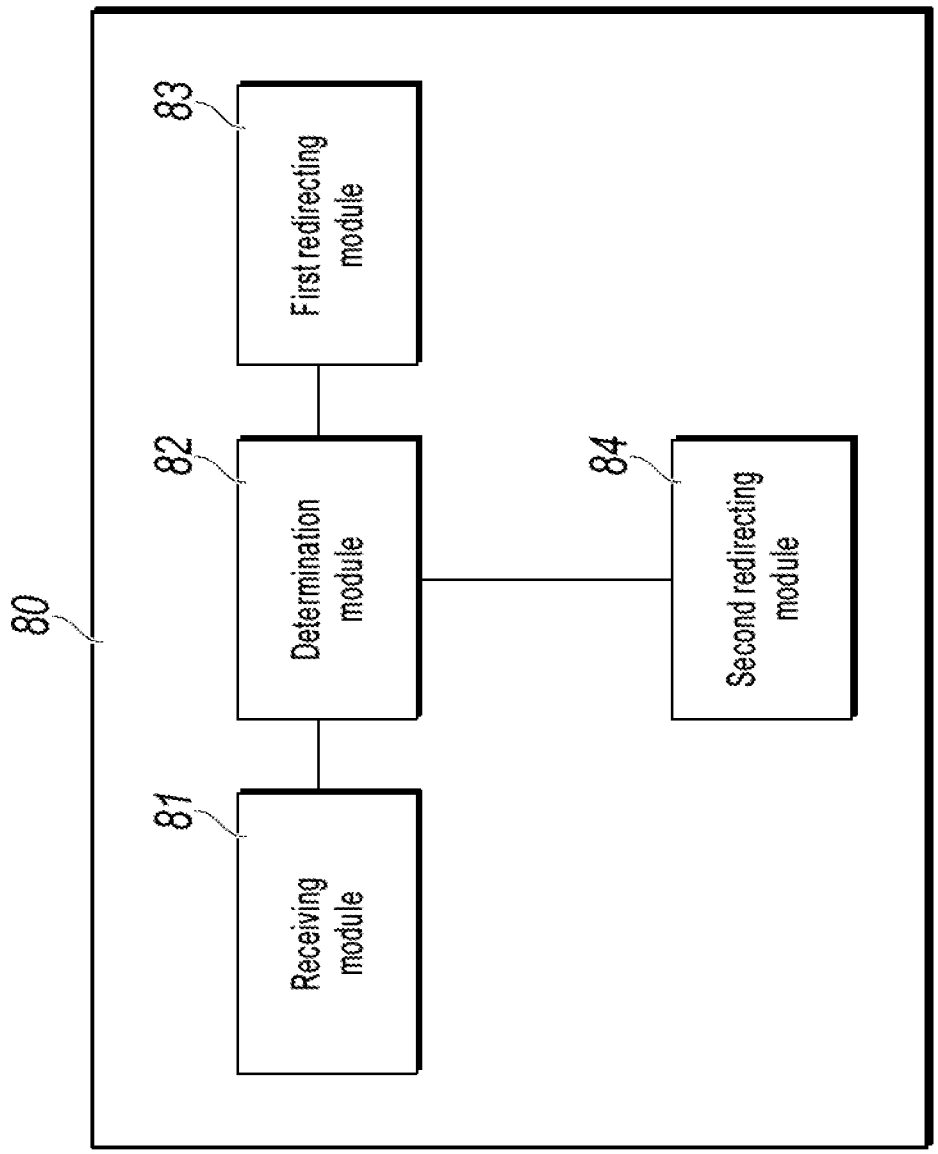
FIG. 8 is a schematic structural diagram illustrating a device for processing a hyperlink object, according to an implementation of the present application.

FIG. 8 is a schematic structural diagram illustrating a device for processing a hyperlink object, according to an implementation of the present application.

Referring to FIG. 8, device 80 includes receiving module 81, determination module 82, first redirecting module 83, and second redirecting module 84.

Receiving module 81 is configured to receive an operation instruction for a hyperlink object.

Determination module 82 is configured to determine whether a predetermined event other than the operation instruction exists when the operation instruction is received.

First redirecting module 83 is configured to redirect to a target page based on a hyperlink if the previously mentioned predetermined event does not exist.

Second redirecting module 84 is configured to determine an associated page corresponding to the existing predetermined event, and redirect to the associated page, if the previously mentioned predetermined event exists.

The associated page is related to the target page.

In some implementations, the predetermined event includes a keyboard event or a mouse event.

In some implementations, the associated page includes a simplified page of the target page.

In some implementations, the associated page includes a page for performing a further operation on content related to the hyperlink object on the target page.

In some implementations, the associated page includes a simplified page of a page for performing a further operation on content related to the hyperlink object on the target page.

In some implementations, the determining an associated page corresponding to the existing predetermined event includes: determining, based on a mapping relationship between the predetermined event and the associated page, the associated page corresponding to the existing predetermined event.

In some implementations, the determining, based on a mapping relationship between the predetermined event and the associated page, the associated page corresponding to the existing predetermined event includes determining, based on the pre-obtained mapping relationship between the predetermined event and the associated page, the associated page corresponding to the existing predetermined event.

The pre-obtained mapping relationship includes the locally configured mapping relationship or the mapping relationship obtained from a server.

The determining, based on a mapping relationship between the predetermined event and the associated page, the associated page corresponding to the existing predetermined event includes: sending the existing predetermined event to a server, so that the server determines, based on the configured mapping relationship between the predetermined event and the associated page, the associated page corresponding to the existing predetermined event; and receiving information that is about the associated page and that is sent by the server.

The operation instruction includes a click instruction.

Figure 9:
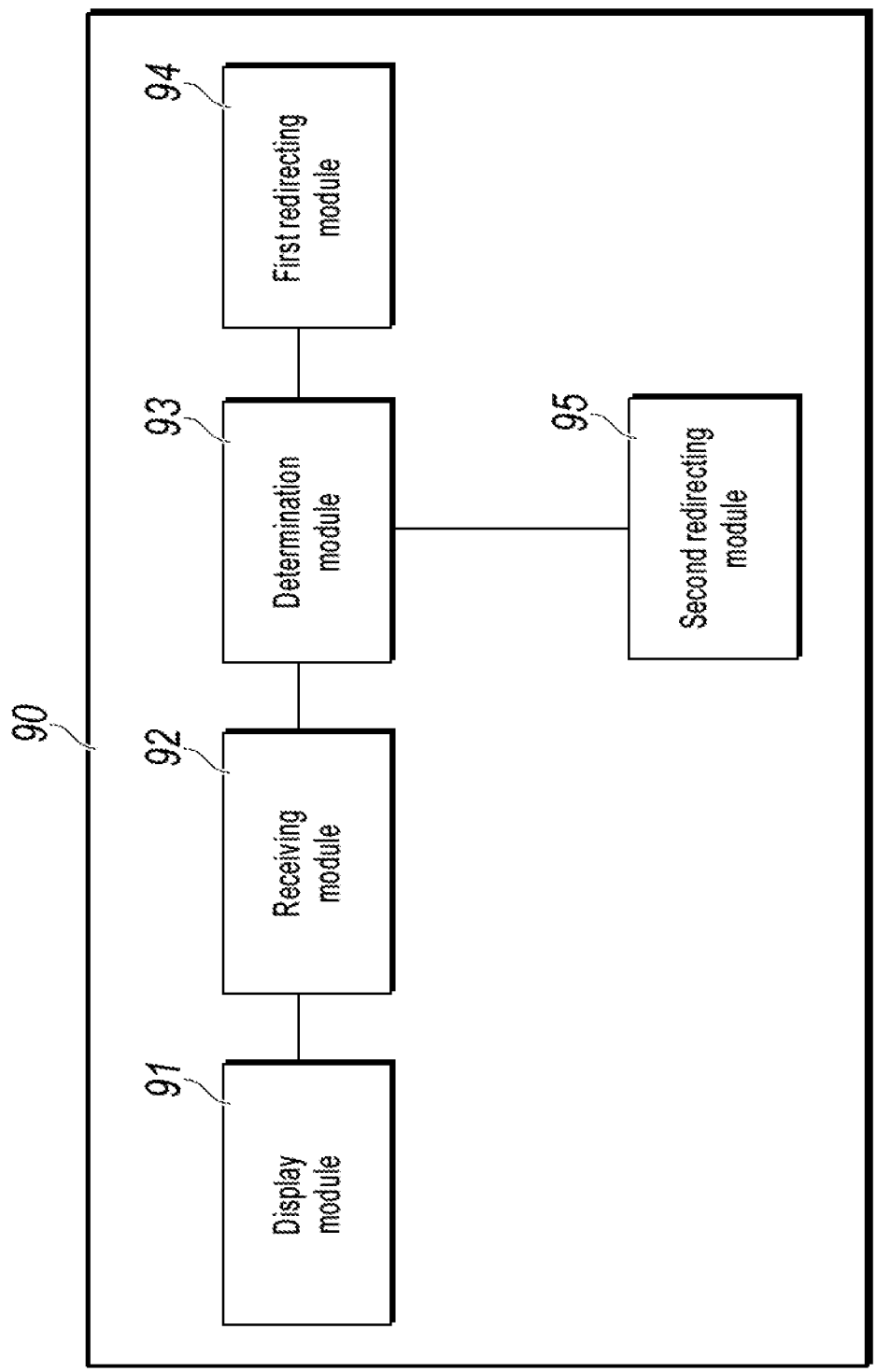
FIG. 9 is a schematic structural diagram illustrating a device for processing a hyperlink object, according to another implementation of the present application.

Further, referring to FIG. 9, when the previously described device is applied to a shopping website, corresponding device 90 can include display module 91, receiving module 92, determination module 93, first redirecting module 94, and second redirecting module 95. Display module 91 is configured to display a webpage, where the webpage includes a merchandise picture with a hyperlink.

Receiving module 92 is configured to receive an operation instruction for the picture.

Determination module 93 is configured to determine whether a predetermined event other than the operation instruction exists when the operation instruction is received.

First redirecting module 94 is configured to redirect to a target page of merchandise included in the picture if the previously mentioned predetermined event does not exist.

Second redirecting module 95 is configured to redirect to a purchase window of merchandise included in the picture if the previously mentioned predetermined event exists.

Figure 10:
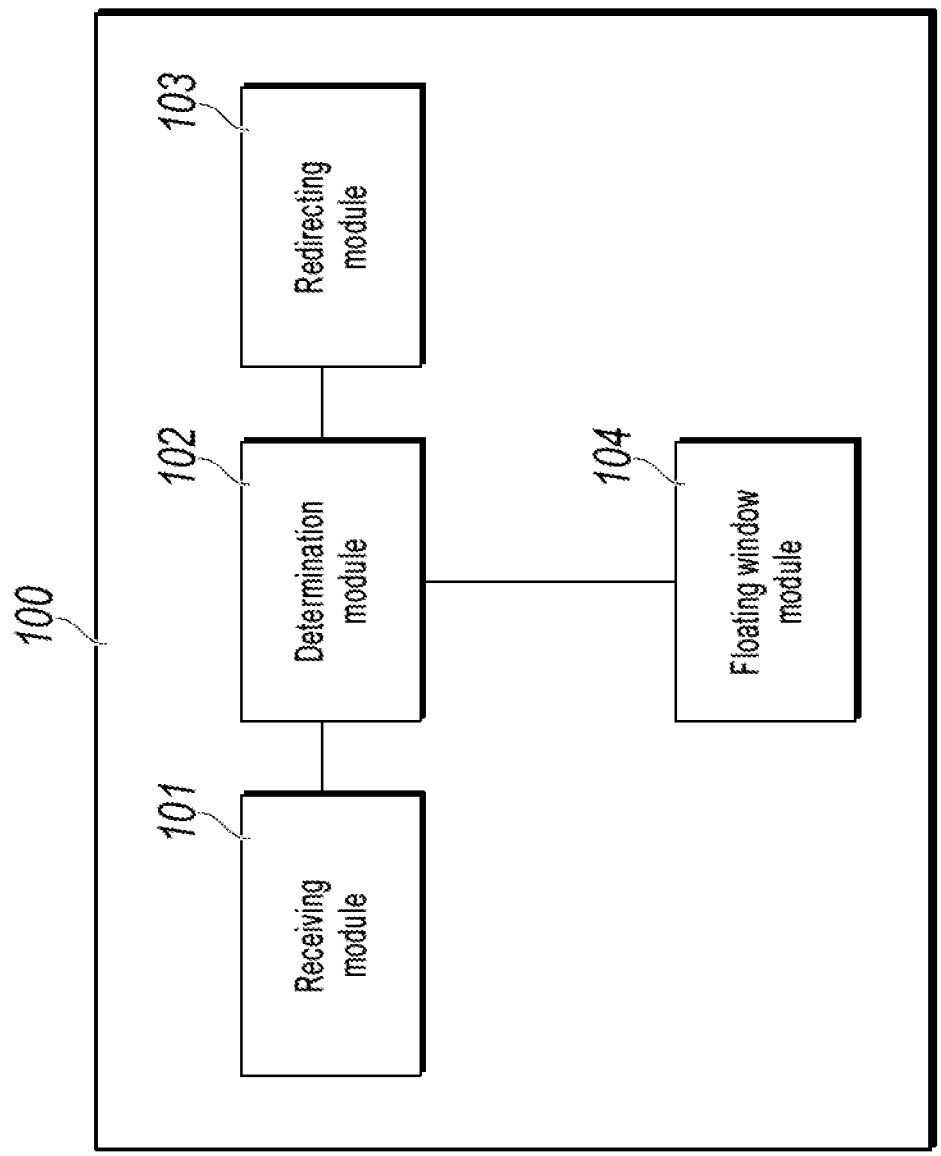
FIG. 10 is a schematic structural diagram illustrating a device for processing a hyperlink object, according to another implementation of the present application.

FIG. 10 is a schematic structural diagram illustrating a device for processing a hyperlink object, according to an implementation of the present application.

Referring to FIG. 10, device 100 includes receiving module 101, determination module 102, redirecting module 103, and floating window module 104.

Receiving module 101 is configured to receive an operation instruction for a hyperlink object.

Determination module 102 is configured to determine whether a predetermined event other than the operation instruction exists when the operation instruction is received.

Redirecting module 103 is configured to redirect to a target page based on a hyperlink if the previously mentioned predetermined event does not exist.

Floating window module 104 is configured to determine a simplified page corresponding to the existing predetermined event, and display the simplified page in the form of a floating window, if the previously mentioned predetermined event exists.

The simplified page is generated based on the target page or an associated page related to the target page.

In some implementations, the predetermined event includes a keyboard event or a mouse event.

In some implementations, the associated page includes a page obtained after an operation is performed on the target page.

In some implementations, the determining a simplified page corresponding to the existing predetermined event includes: determining, based on a mapping relationship between the predetermined event and the simplified page, the simplified page corresponding to the existing predetermined event.

In some implementations, the determining, based on a mapping relationship between the predetermined event and the simplified page, the simplified page corresponding to the existing predetermined event includes: determining, based on the pre-obtained mapping relationship between the predetermined event and the simplified page, the simplified page corresponding to the existing predetermined event.

The pre-obtained mapping relationship includes the locally configured mapping relationship or the mapping relationship obtained from a server.

In some implementations, the determining, based on a mapping relationship between the predetermined event and the simplified page, the simplified page corresponding to the existing predetermined event includes: sending the existing predetermined event to a server, so that the server determines, based on the configured mapping relationship between the predetermined event and the simplified page, the simplified page corresponding to the existing predetermined event; and receiving information that is about the simplified page and that is sent by the server.

In some implementations, the operation instruction includes a click instruction.

Figure 11:
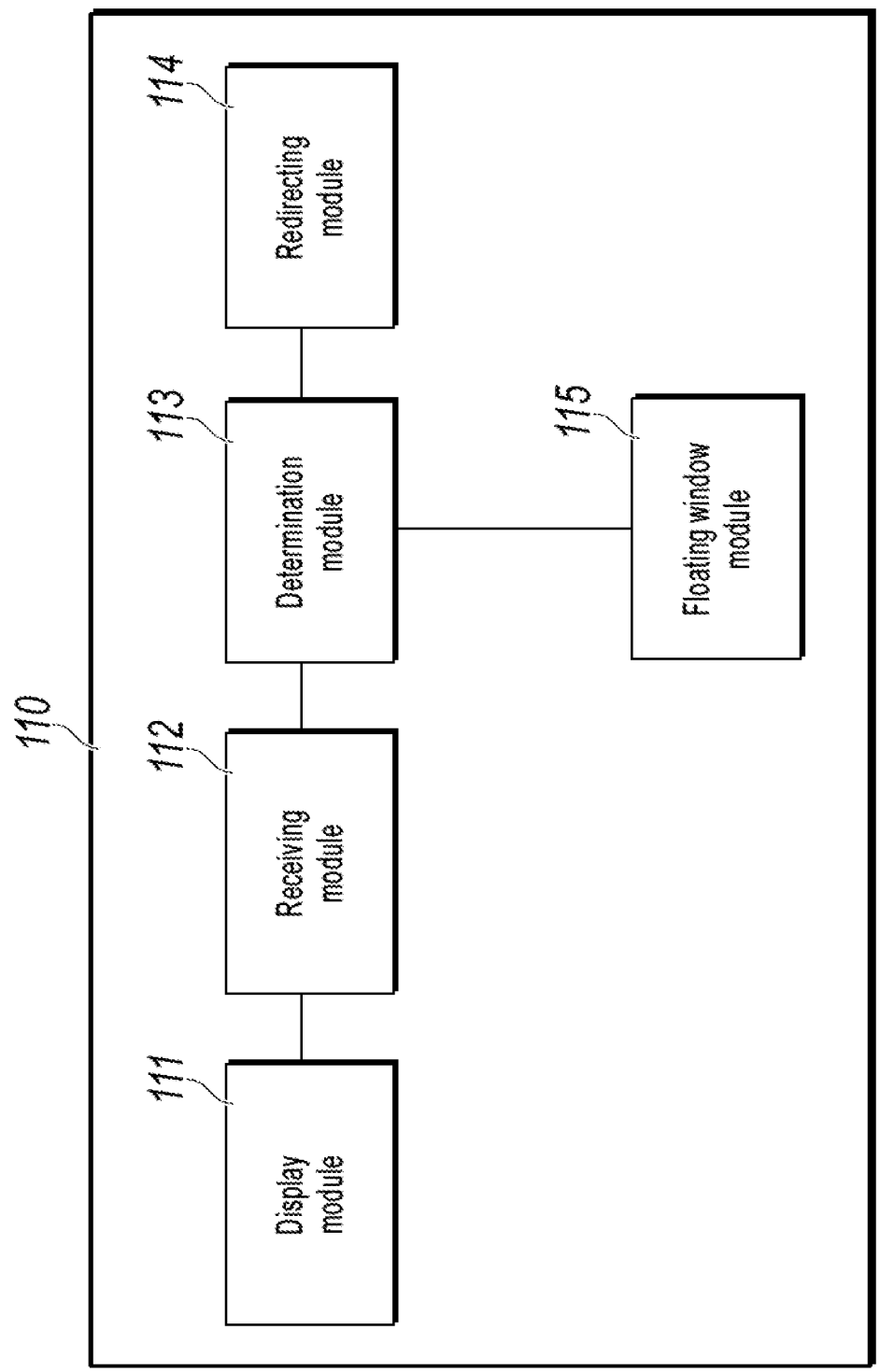
FIG. 11 is a schematic structural diagram illustrating a device for processing a hyperlink object, according to another implementation of the present application.

Further, referring to FIG. 11, when the previously described device is applied to a shopping website, corresponding device 110 includes display module 111, receiving module 112, determination module 113, redirecting module 114, and floating window module 115.

Display module 111 is configured to display a webpage, where the webpage includes a merchandise picture with a hyperlink.

The receiving module 112 is configured to receive an operation instruction for the picture.

Determination module 113 is configured to determine whether a predetermined event other than the operation instruction exists when the operation instruction is received.

Redirecting module 114 is configured to redirect to a target page of merchandise included in the picture if the previously mentioned predetermined event does not exist.

Floating window module 115 is configured to display a simplified page of a purchase window of merchandise included in the picture in the form of a floating window if the previously mentioned predetermined event exists.

It can be understood that the devices in the implementations are corresponding to the method implementations. For specific content, reference can be made to related descriptions in the method implementations, and details are omitted here for simplicity.

In the implementations, a hyperlink target corresponding to the predetermined event is obtained and the hyperlink target is displayed, so that when users click on the same hyperlink object, different events can be generated to open different hyperlink targets, to satisfy diversified user demands. Further, if no predetermined event is detected or no feedback action corresponds to the predetermined event, a common hyperlink mode can be used for implementation, so that the present solution is compatible with the existing solution, and can be applied to an existing page.

It is worthwhile to note that in the description of the present application, the terms "first", "second", etc. are merely used for description, but cannot be understood as an indication or implication of relative importance. In addition, in the description of the present application, "a plurality of" means "at least two" unless otherwise stated.

Descriptions of any process or method described in a flowchart or described in another way here can be understood as follows: One or more modules, segments, or parts of code of an executable instruction that is used to implement a specific logical function or operation step are included, the scope of the example implementations of the present application includes other implementations, and functions can be performed in a sequence other than a shown or discussed sequence, for example, in a basically simultaneous way or a reverse sequence based on the functions. It should be understood by a person skilled in the art of the implementations of the present application.

It should be understood that the parts of the present application can be implemented by using hardware, software, firmware, or a combination thereof. In the previous implementations, a plurality of steps or methods can be implemented by using software or firmware that is stored in a memory and that is executed by an appropriate instruction execution system. For example, if hardware is used for implementation, similar to implementation in another implementation, any one or a combination of the following well-known technologies in the art can be used for implementation: a discrete logic circuit with a logic gate circuit configured to implement a logical function for a data signal, an application-specific integrated circuit with an appropriate combinatorial logic gate circuit, a programmable gate array (PGA), a field programmable gate array (FPGA), etc.

A person of ordinary skill in the art can understand that all or some of the steps included in the method implementations can be implemented by using a program instructing relevant hardware. The program can be stored in a computer readable storage medium. When the program is executed, one or a combination of the steps in the method implementations is performed.

In addition, the function units in the implementations of the present application can be integrated into one processing module, or each of the units can exist alone physically, or two or more units can be integrated into one module. The integrated module can be implemented in the form of hardware, or can be implemented in the form of a software function module. When the integrated module is implemented in the form of a software function module and sold or used as independent merchandise, the integrated unit can be stored in a computer readable storage medium.

The storage medium can be a read-only memory, a magnetic disk, an optical disc, etc.

In the description of the present specification, descriptions of reference terms such as "an implementation", "some implementations", "an example", "a specific example", and "some examples" mean that specific features, structures, materials, or characteristics described with reference to the implementations or examples are included in at least one implementation or example of the present application. In the present specification, example expressions of the terms are not necessarily with respect to the same embodiment or example. In addition, the described specific features, structures, materials, or characteristics can be combined in a proper way in any one or more of the implementations or examples.

Although the implementations of the present application are shown and described above, it can be understood that the previous implementations are examples, and cannot be construed as a limitation on the present application. A person of ordinary skill in the art can make changes, modifications, replacements, and variations to the previous implementations within the scope of the present application.

Figure 12:
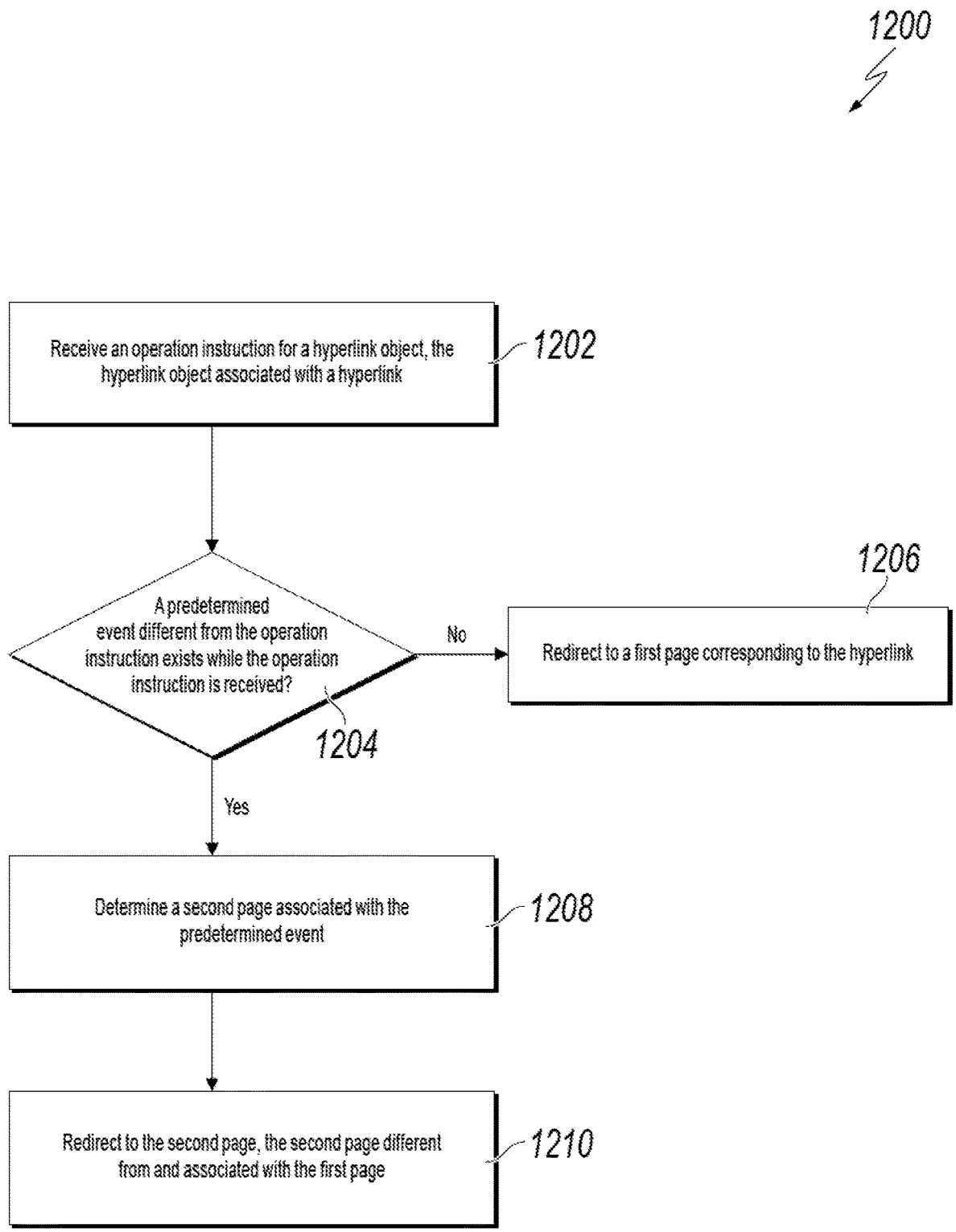
FIG. 12 is a flowchart illustrating an example of a computer-implemented method for processing a hyperlink object, according to an implementation of the present disclosure.

FIG. 12 is a flowchart illustrating an example of a computer-implemented method 1200 for processing a hyperlink object, according to an implementation of the present disclosure. For clarity of presentation, the description that follows generally describes method 1200 in the context of the other figures in this description. However, it will be understood that method 1200 can be performed, for example, by any system, environment, software, and hardware, or a combination of systems, environments, software, and hardware, as appropriate. In some implementations, various steps of method 1200 can be run in parallel, in combination, in loops, or in any order.

At 1202, an operation instruction for a hyperlink object is received. The hyperlink object is associated with a hyperlink. For example, the hyperlink object can be a text or a picture. The hyperlink can point to a picture, an email address, a file, or an application that is associated with the hyperlink object. In some implementations, the operation instruction can be a click instruction on the hyperlink object. For example, if a user clicks on a merchandise picture (such as a picture of a pair of shoes) when browsing a merchandise website, more information about the merchandise can be displayed. From 1202, method 1200 proceeds to 1204.

At 1204, a determination is made as to whether a predetermined event exists when the operation instruction is received. If it is determined that the predetermined event does not exist when the operation instruction is received, method 1200 proceeds to 1206. Otherwise, if it is determined that the predetermined event exists when the operation instruction is received, method 1200 proceeds to 1208. The predetermined event can be different from the operation instruction. In other words, in addition to the operation instruction, another event (such as the predetermined event) may exist when performing an operation on the hyperlink object. In some implementations, the predetermined event can include at least one of a keyboard event, a mouse event, or a screen touch event. For example, the keyboard event can include pressing one or more keys on a keyboard. The mouse event can include at least one of clicking a mouse or sliding a mouse. In some implementations, the predetermined event and the operation instruction occur simultaneously or substantially simultaneously.

In some implementations, a predetermined event list can be predetermined. The predetermined event list can include multiple predetermined events (such as, pressing a "G" key, pressing a "Q" key, pressing a "W" key, and pressing a "S" key). The predetermined event list can be created, modified, and/or configured by, for example, an administrator. For example, the predetermined event list can be locally configured in a browser. When the browser detects that a click instruction for the hyperlink object is received and that another event exists when receiving the click instruction, the browser can determine, based on the predetermined event list, whether the another event is a predetermined event. In some cases, the predetermined event list can be configured in a server. When the browser detects that a click instruction for the hyperlink object is received and that another event exists when receiving the click instruction, the browser can transmit the detected another event to the server. The server determines, based on the predetermined event list, whether the detected another event is a predetermined event, and transmits the determination to the browse.

At 1206, a first page corresponding to the hyperlink is redirected to. For example, if a user clicks on a merchandise picture (such as a picture of a pair of shoes) when browsing a merchandise website, more information about the merchandise can be displayed in the first page. After 1206, method 1200 stops.

At 1208, a second page associated with the predetermined event is determined. In some implementations, the second page can be one of a simplified page of the first page, a third page obtained after performing one or more operations on the first page, or a simplified page of the third page. The second page can be determined based on a mapping relationship between the predetermined event and the second page (such as Table 1 described previously). The mapping relationship can be predetermined. In some implementations, the mapping relationship can be created, modified, and/or configured by an administrator. For example, the mapping relationship can be locally obtained, and a second page can be determined based on the mapping relationship and the predetermined event. In some cases, the mapping relationship can be obtained from a server. For example, the predetermined event can be transmitted to a server. The server can determine the second page associated with the predetermined event based on the mapping relationship. Information associated with the second page can be received from the server. From 1208, method 1200 proceeds to 1210.

At 1210, the second page is redirected to. The second page is associated with but different from the first page. For example, if a user clicks on a merchandise picture using a mouse (that is, an operation instruction) and at the same time presses a "G" key on a keyboard (that is, a predetermined event), a purchase window for the merchandise can be displayed in the second page instead of more information about the merchandise displayed in the first page. After 1206, method 1200 stops.

In some implementations, before receiving the operation instruction for the hyperlink object, a mouse hovering over a location of the hyperlink object can be detected. For example, a user can move a mouse to a location of a merchandise picture that the user is interested in before clicking on the merchandise picture. In response to the detection, a prompt message can be displayed. The prompt message can indicate a mapping relationship between the predetermined event and the second page. For example, pressing a "G" key with the operation instruction can open a quick purchase page, and pressing a "W" key with the operation instruction can open a shopping cart page. The prompt message can be displayed in, for example, a floating window or a bubble.

In some implementations, before receiving the operation instruction for the hyperlink object, a webpage (such as a merchandise website) can be displayed. The displayed webpage can include the hyperlink object. The hyperlink object can be a merchandise picture including the hyperlink. The second page can be a merchandise purchase window associated with the merchandise picture. In some cases, redirecting to the second page comprises displaying the second page in a floating window.

A user can click on a hyperlink object to open or run a corresponding hyperlink target. Normally, when different users click on the same hyperlink object, the same hyperlink target is opened or run. This hyperlink mode is simple, and as a result cannot satisfy diversified user demands. The subject matter described in this specification can be used to process a hyperlink object to satisfy diversified user demands. For example, when different users click on the same hyperlink object, different events can be generated at the same time to open different hyperlink targets instead of the same hyperlink target. As a result, different user demands can be satisfied. In addition, if no other event is detected while clicking the hyperlink object, the common hyperlink mode can be used, thereby providing compatibility with existing hyperlink object processing solutions.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
receiving an operation instruction on a hyperlink object presented on a webpage of a browser, wherein the hyperlink object is associated with a single hyperlink;
determining whether a predetermined event of a plurality of predetermined events exists at a same time when the operation instruction is received, wherein the plurality of predetermined events are associated with a corresponding plurality of associated pages, and wherein the plurality of predetermined events include a keyboard event including pressing one or more keys on a keyboard;
in response to determining that the predetermined event does not exist at the same time when the operation instruction is received:
redirecting the browser to open a first page corresponding to the single hyperlink; and
in response to determining that the predetermined event exists at the same time when the operation instruction is received:
determining a second page associated with the predetermined event from the corresponding plurality of associated pages based on a predetermined event table, wherein the predetermined event table includes a mapping relationship between pressing a first key and a simplified page, a mapping relationship between pressing a second key and a quick purchase window, a mapping relationship between pressing a third key and an add-to-cart window, and a mapping relationship between pressing a fourth key and an information comparison page; and
redirecting the browser to open the second page, wherein the second page is different from, and associated with, the first page.

2. The computer-implemented method of claim 1, wherein the operation instruction is a click instruction on the hyperlink object.

3. The computer-implemented method of claim 1, wherein the second page is one of a simplified page of the first page, a third page obtained after performing one or more operations on the first page, or a simplified page of the third page.

4. The computer-implemented method of claim 1, wherein the second page is determined based on a mapping relationship between the predetermined event and the second page.

5. The computer-implemented method of claim 4, wherein the mapping relationship is obtained locally or from a server.

6. The computer-implemented method of claim 4, wherein determining the second page associated with the predetermined event comprises:
transmitting the predetermined event to a server, wherein the server determines the second page associated with the predetermined event based on the mapping relationship between the predetermined event and the second page; and
receiving information associated with the second page from the server.

7. The computer-implemented method of claim 1, wherein, before receiving the operation instruction on the hyperlink object, the method further comprises:
detecting a mouse hover over a location of the hyperlink object; and
in response to the detection, displaying a prompt message indicating a mapping relationship between the predetermined event and the second page.

8. The computer-implemented method of claim 1, wherein, before receiving the operation instruction on the hyperlink object, the method further comprises displaying the webpage, wherein the webpage includes the hyperlink object, and the hyperlink object is a merchandise picture including the single hyperlink.

9. The computer-implemented method of claim 8, wherein the second page is a merchandise purchase window associated with the merchandise picture, and redirecting to the second page comprises displaying the second page in a floating window.

10. The computer-implemented method of claim 1, wherein the first key is a "Q" key, the second key is a "G" key, the third key is a "W" key, and the fourth key is an "S" key.

11. A non-transitory, computer-readable medium storing one or more instructions executable by a computer system to perform operations comprising:
receiving an operation instruction on a hyperlink object presented on a webpage of a browser, wherein the hyperlink object is associated with a single hyperlink;
determining whether a predetermined event of a plurality of predetermined events exists at a same time when the operation instruction is received, wherein the plurality of predetermined events are associated with a corresponding plurality of associated pages, and wherein the plurality of predetermined events include a keyboard event including pressing one or more keys on a keyboard;
in response to determining that the predetermined event does not exist at the same time when the operation instruction is received:
redirecting the browser to open a first page corresponding to the single hyperlink; and
in response to determining that the predetermined event exists at the same time when the operation instruction is received:
determining a second page associated with the predetermined event from the corresponding plurality of associated pages based on a predetermined event table, wherein the predetermined event table includes a mapping relationship between pressing a first key and a simplified page, a mapping relationship between pressing a second key and a quick purchase window, a mapping relationship between pressing a third key and an add-to-cart window, and a mapping relationship between pressing a fourth key and an information comparison page; and
redirecting the browser to open the second page, wherein the second page is different from, and associated with, the first page.

12. The non-transitory, computer-readable medium of claim 11, wherein the operation instruction is a click instruction on the hyperlink object.

13. The non-transitory, computer-readable medium of claim 11, wherein the second page is one of a simplified page of the first page, a third page obtained after performing one or more operations on the first page, or a simplified page of the third page.

14. The non-transitory, computer-readable medium of claim 11, wherein the second page is determined based on a mapping relationship between the predetermined event and the second page.

15. The non-transitory, computer-readable medium of claim 14, wherein the mapping relationship is obtained locally or from a server.

16. The non-transitory, computer-readable medium of claim 14, wherein determining the second page associated with the predetermined event comprises:
  transmitting the predetermined event to a server, wherein the server determines the second page associated with the predetermined event based on the mapping relationship between the predetermined event and the second page; and
  receiving information associated with the second page from the server.

17. The non-transitory, computer-readable medium of claim 11, wherein, before receiving the operation instruction on the hyperlink object, the operations further comprises:
  detecting a mouse hover over a location of the hyperlink object; and
  in response to the detection, displaying a prompt message indicating a mapping relationship between the predetermined event and the second page.

18. The non-transitory, computer-readable medium of claim 11, wherein, before receiving the operation instruction on the hyperlink object, the operations further comprises displaying the webpage, wherein the webpage includes the hyperlink object, and the hyperlink object is a merchandise picture including the single hyperlink.

19. The non-transitory, computer-readable medium of claim 11, wherein the first key is a "Q" key, the second key is a "G" key, the third key is a "W" key, and the fourth key is an "S" key.

20. A computer-implemented system, comprising:
  one or more computers; and
  one or more computer memory devices interoperably coupled with the one or more computers and having tangible, non-transitory, machine-readable media storing one or more instructions that, when executed by the one or more computers, perform one or more operations comprising:
    receiving an operation instruction on a hyperlink object presented on a webpage of a browser, wherein the hyperlink object is associated with a single hyperlink;
    determining whether a predetermined event of a plurality of predetermined events exists at a same time when the operation instruction is received, wherein the plurality of predetermined events are associated with a corresponding plurality of associated pages, and wherein the plurality of predetermined events include a keyboard event including pressing one or more keys on a keyboard;
    in response to determining that the predetermined event does not exist at the same time when the operation instruction is received:
      redirecting the browser to open a first page corresponding to the single hyperlink; and
    in response to determining that the predetermined event exists at the same time when the operation instruction is received:
      determining a second page associated with the predetermined event from the corresponding plurality of associated pages based on a predetermined event table, wherein the predetermined event table includes a mapping relationship between pressing a first key and a simplified page, a mapping relationship between pressing a second key and a quick purchase window, a mapping relationship between pressing a third key and an add-to-cart window, and a mapping relationship between pressing a fourth key and an information comparison page; and
      redirecting the browser to open the second page, wherein the second page is different from, and associated with, the first page.

21. The computer-implemented system of claim 20, wherein the operation instruction is a click instruction on the hyperlink object.

22. The computer-implemented method of claim 1, wherein the plurality of predetermined events further include at least one of a mouse event including at least one of clicking or sliding a mouse, or a screen touch event.

23. The computer-implemented system of claim 20, wherein the first key is a "Q" key, the second key is a "G" key, the third key is a "W" key, and the fourth key is an "S" key.

* * * * *